Oct. 24, 1939.  A. M. YOUNG  2,176,940
AUTOMATIC TOASTER
Filed Jan. 6, 1938  3 Sheets-Sheet 1
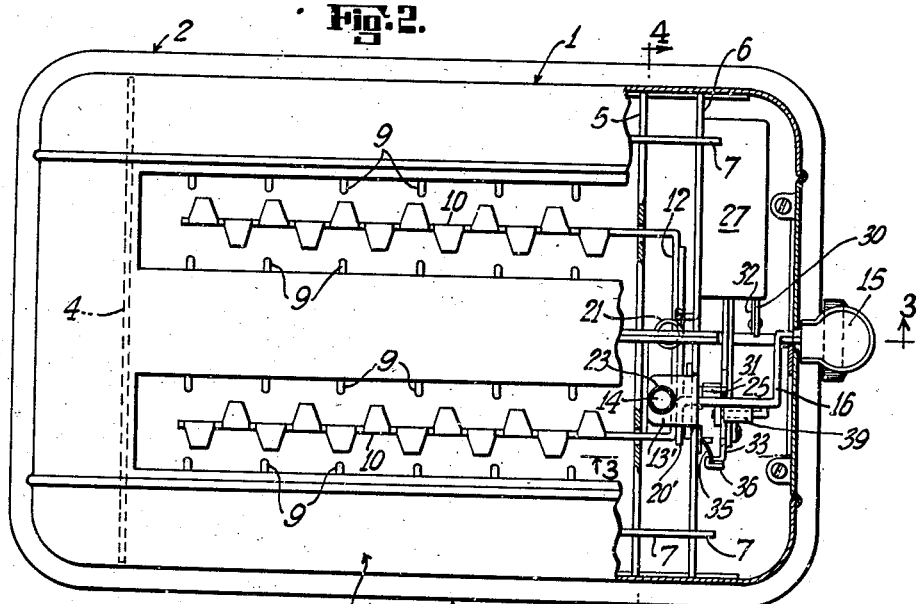
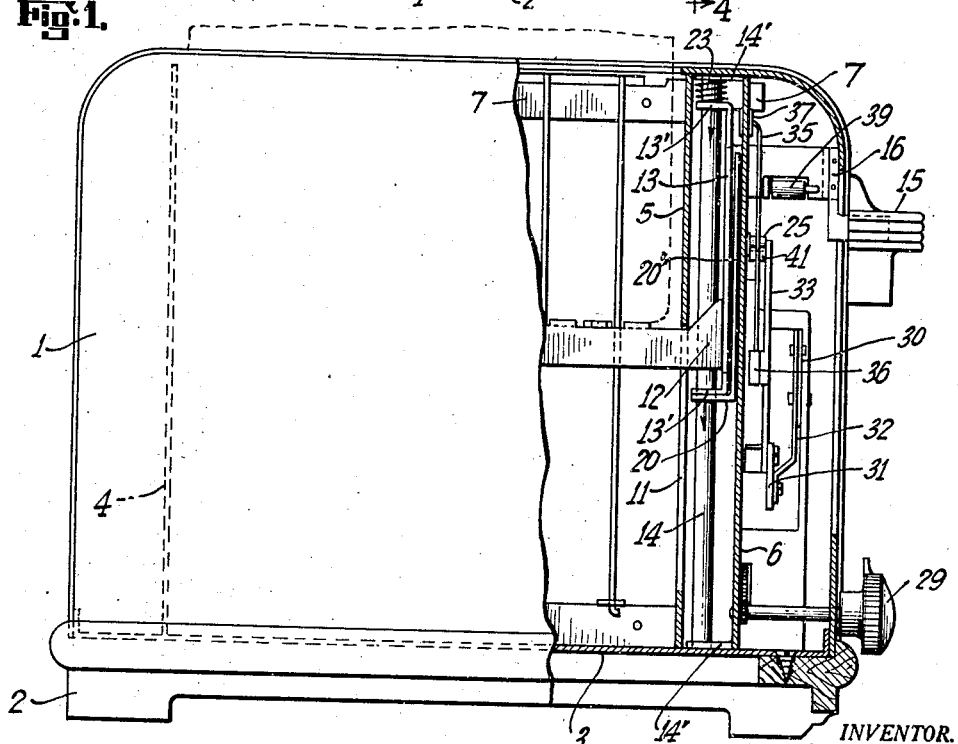
INVENTOR.
Allan M. Young
BY
Bartlett Eyre Scott & Neel
ATTORNEYS.

Oct. 24, 1939.  A. M. YOUNG  2,176,940
AUTOMATIC TOASTER
Filed Jan. 6, 1938    3 Sheets-Sheet 2

INVENTOR.
Allan M. Young
BY
ATTORNEYS.

Oct. 24, 1939.　　　A. M. YOUNG　　　2,176,940
AUTOMATIC TOASTER
Filed Jan. 6, 1938　　　3 Sheets-Sheet 3

INVENTOR.
Allan M. Young
BY
ATTORNEYS.

Patented Oct. 24, 1939

2,176,940

UNITED STATES PATENT OFFICE 2,176,940

AUTOMATIC TOASTER

Allan M. Young, Meriden, Conn., assignor to Manning, Bowman & Co., Meriden, Conn., a corporation of Delaware Application January 6, 1938, Serial No. 183,659

20 Claims. (Cl. 219—19)

This invention relates to automatic electric toasters and the like.

One object of the invention is an automatic toaster embodying a timing and automatic switch mechanism and having a novel means whereby the toast may be inspected at any time without resetting or interfering with the operation of the timing and switch mechanism.

A further object of the invention is a toaster of the above indicated character having a common starting and toast inspection lever with mechanism associated therewith permitting the setting of the toaster for a toasting operation of predetermined time and at the same time permitting the elevation of the toast for inspection without interfering with or resetting the timing mechanism.

A further object of the invention is an automatic toaster of the above indicated character embodying an ejector mechanism together with means whereby the toast may be inspected at any time without interfering with either the timing mechanism or the ejector mechanism.

Further objects of the invention will hereinafter appear.

For a better understanding of the invention reference may be had to the accompanying drawings forming a part of this application, wherein:

Fig. 1 is a side view partly in section of a toaster embodying the invention;

Fig. 2 is a plan view thereof partly in section;

Figure 3:
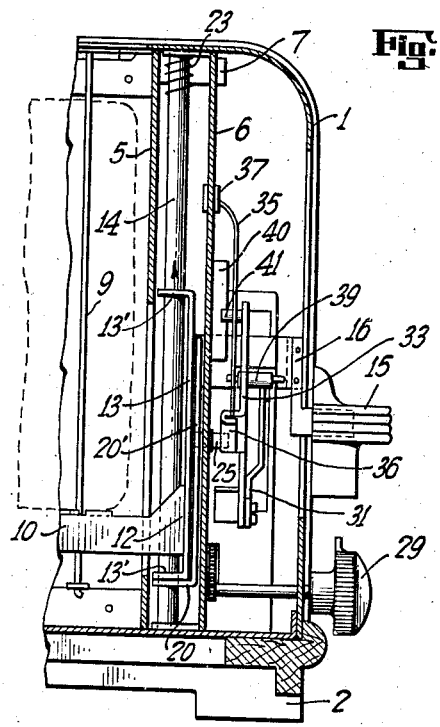
Fig. 3 is a sectional view along the line 3—3 of Fig. 2.
Figure 7:
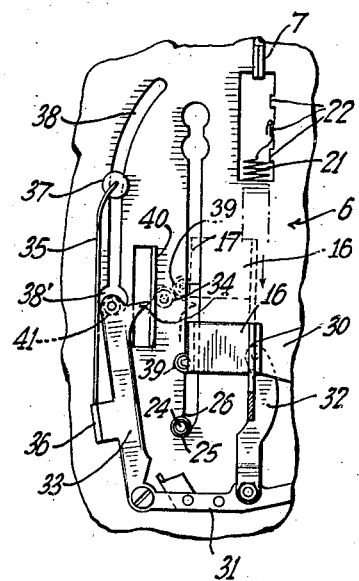
Fig. 7 is an end view, with parts broken away, showing the mechanism.
Figure 4:
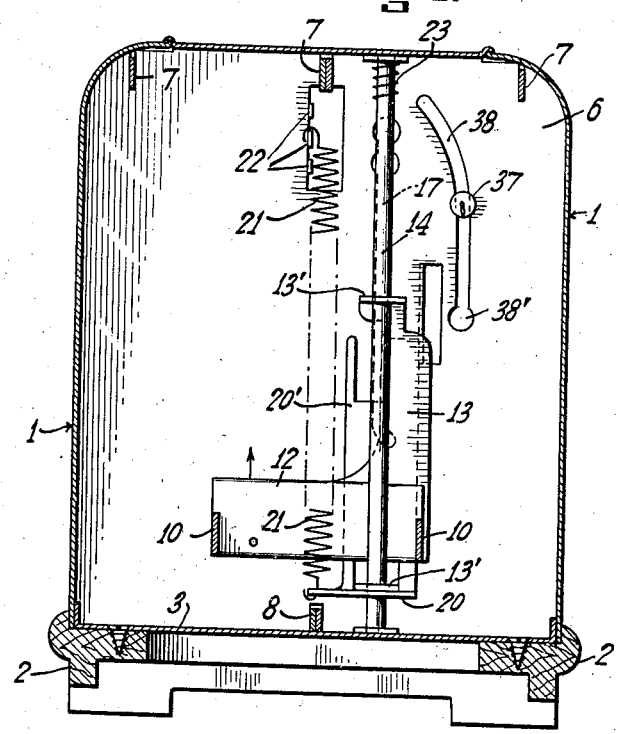
Fig. 4 is a sectional view along the line 4—4 of Fig. 2.
Figure 6:
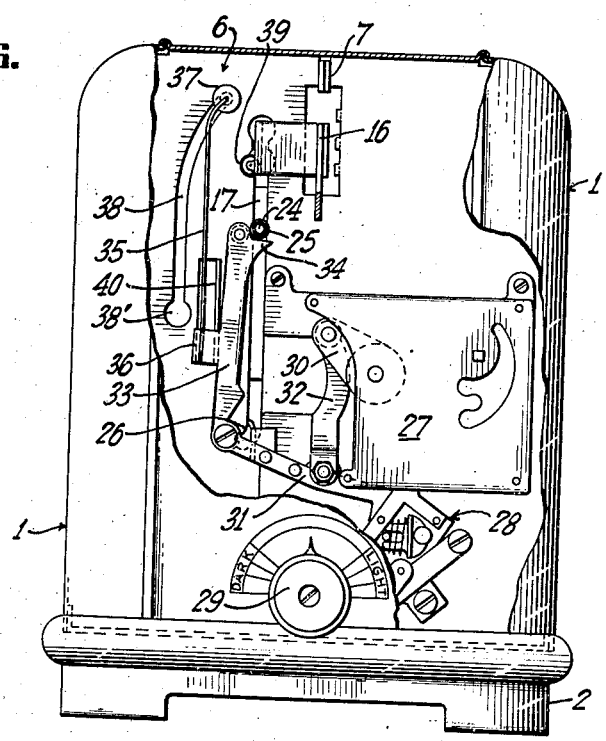
Fig. 6 is an end view showing the mechanism in the off position.
Figure 5:
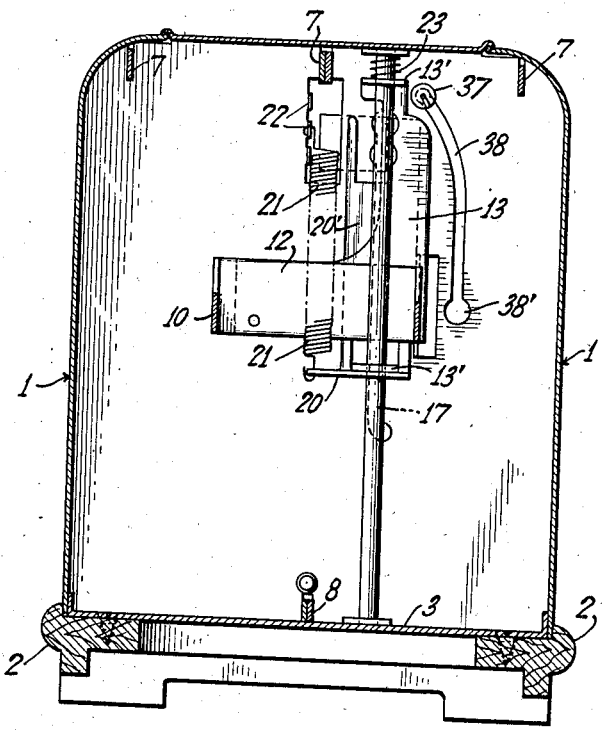
Fig. 5 is a sectional view similar to Fig. 4.

Referring to the drawings the invention is illustrated as embodied in a toaster having a casing 1 which is generally of rectangular shape in plan, side and end views with a base support 2 therefor of suitable material, as for example wood, but it is understood that the invention is applicable to other types and design of casings and supports therefor. The toaster frame of the embodiment shown comprises a base plate 3, a back vertical end plate 4, and a pair of front spaced vertical end plate 5 and 6, these plates being held together by any suiable means comprising upper and lower fastening and spacing elements 7 and 8. All of these elements may be of sheet metal or other suitable material. The electrical heating elements are carried by these upper and lower spacing elements 7 and 8, and the members 7 and 8 also carry the vertically disposed wires 9 which form vertically disposed chambers for the reception of the slices of toast and form spacing and centering means for retaining the toast in spaced heating relation to the electric heaters.

In each of the toasting chambers is disposed a rack 10 which during the toasting operation is disposed at the bottom of the toast chamber. These racks 10 are formed from a U-shaped member 12 with the legs which form the racks 10 passing through vertical guide slots 11 formed in the end plate 5. This U member 12 is fastened to a vertical guide piece 13 having its upper and lower ends turned at right angles to form the parts 13' and these parts 13' are perforated to receive the guide post 14, the latter thus guiding the member 13 up and down. To the guide member 13 is fastened a starting and toast inspecting member 15 and in the particular embodiment shown this member 15 is carried by an angle piece 16 formed integrally with the guide member 13, this angle member 16 passing through a vertical guide slot 17 formed in the end plate 6. The vertical guide post 14 may be secured in any suitable manner, as for example by means of ears 14' formed on the upper and lower edges of the end plate 6.

The embodiment of the invention shown is of the ejector type comprising an elevator or ejector 20 threaded over the guide post 14 and disposed underneath the lower part 13' of the rack guide 13. This elevator 20 is provided with a vertical guide plate 20' sliding between the guide member 13 and the plate 16, and an elevating or ejecting spring 21 is fastened at its lower end to the elevator 20 and at its upper end to either of the fastening lugs 22 formed from the end plate 6, and a bumper spring 23 is disposed around the upper end of the guide post and between the upper guide part 13' and the upper fastening part or ear 14'. Fastened to the elevator guide plate 20' is a pin 24 which projects through the guide slot 17 in end plate 6 and is provided with a roller 25 thereon. The bottom of the slot 17 is formed into a curve with the upper surface 26 thereof forming a shoulder for retaining the pin 24 in its lowermost position in the slot 17 until it is kicked out by the timing mechanism as hereinafter described.

The timing mechanism is indicated generally at 27 and the automatic switch is indicated generally at 28 and at 29 is indicated generally the conventional means for setting the timing mechanism for light or dark toast. At 30 and 31 are indicated lever members connected by a link 32 for setting the timing mechanism and closing the switch, that is, by actuating the lever 31 the timer and the switch may be set in the usual and conventional manner. To the outer end of the lever 31 is pivotally fastened a setting member or pawl 33, which extends generally in an upward direction, and having at its upper end a pawl tooth or lug 34 which, with the mechanism in the off position, is disposed underneath and in the path of a roller 39 carried by the angle member 16 which carries the manually operated member 15. The pawl is held in this position by a follower spring 35 which is fastened at its lower end to the pawl 33, as for example by being fastened to a lug or ear 36 formed from the pawl 33. The follower spring 35 is fastened at its upper end to a follower roller 37 which is adapted to traverse a slot 38 formed in the end plate 6. This slot at its upper end is observed to curve towards the guide slot 17 and the actuating roller 39, and, accordingly, when the follower roller 37 is in the upper end of the slot 38 the pawl 33, through the spring 35 is urged over to assume a position with the pawl tooth 34 underneath and in the path of the roller 39. However, when the pawl 33 is moved downwardly to set the timer and the switch, the roller 37 is caused to traverse the slot 38 with the result that the roller moves laterally away from the roller 39, thereby putting tension on the spring 35 and yieldingly urging or tending to urge the pawl 33 to a position out of the path of the roller 39. The roller 37 is of spool shape and may be inserted in the slot at the enlarged circular portion 38' at the bottom for assembly. In order to assure the pawl 33 remaining with its tooth 34 underneath the actuating and setting roller 39 during the time setting operation, an elongated vertical gate 40 is provided for retaining the pawl 33 in the actuating and setting position until the switch and timing mechanism is set. For this purpose there is a guide roller 41 disposed on the back of the upper end of the pawl member 33 which engages the gate 40 on the side thereof towards the slot 17 and positively holds the pawl 33 in a position underneath the actuating roller 39 during the downward movement of the pawl 33 for actuating the lever 31 and setting the timing and switch mechanisms. This gate 40 is formed in any suitable manner, as for example by means of a vertical flange turned from the end plate 6. The length and position of this gate is such as to assure the setting of the timer and the switch before the roller 41 passes beyond the lower end of the gate, but when the roller 41 passes beyond the gate 40 in the downward stroke the pawl 33 is actuated by the spring 35 to pivot about the lever 31 in a direction away from the actuating roller 39 so that when the lever 31 and the pawl 33 begin to move upward during the toasting operation the roller 41 is caused to follow along the side of the gate 40 away from the slot 17 and actuating roller 39, and the pawl 33 is positively held out of the path of the roller 39 during that part of the return stroke.

At the end of the toasting operation the roller 25 is kicked out of the lower end of the slot 17 thereby permitting the elevator or ejector spring 21 to elevate the toast rack to the uppermost position with the toast then occupying the ejected position. For this purpose the lever 31 is provided with a tripping device or trigger 43 which at the end of the toasting operation engages the roller 25 and pushes the pin and roller into the vertical portion of the slot 17, permitting spring 21 to lift the elevator and rack. In the locking position the roller 25 as above indicated is held within the curved lower end of the slot 17 against the upper surface or shoulder 26. This locking and retention of the roller 25 in the lower end of slot 17 is assisted by the ejector spring 21 which is fastened to the end of the elevator 20 at a point removed from the slot 17 and which through the loose fit of the elevator or ejector 20 with the post 14 tends to yieldingly tilt the member 20 and urge the roller 25 into the curved lower end of the slot 17.

The operation of the toaster is clear from the above. The adjusting mechanism 29 is set to give the desired time for the toasting operation. The operator then presses down upon the starting button or member 15, causing the actuating and setting roller 39 carried thereby to engage the pawl 33 and actuate the same in a downward direction, thus moving the levers 31 and 30 to close the switch and set the timer. When the timer and switch are thus set, the roller 41 passes down beneath the lower end of the gate 40, whereupon the spring 35, due to the lateral tension thereof, swings the pawl 33 to a position out of the path of the roller 39 and to a position where the roller 41 is disposed on the opposite side of the gate 40. During the toasting operation the lever 31 and the pawl 33 are gradually moved upward, but the pawl 33 is positively held out of the path of the actuating roller 39 by means of the follower spring 35 and the gate 40 and the roller 41 on the pawl 33. Thus the user may lift the toast rack by means of the button 15 to inspect the toast at any time during the toasting operation without interfering with the toasting operation and without resetting the timer. By downward movement of the button or handle 15, the elevator or ejector 20 is locked in its downward position against the tension of spring 21, the pin and roller 24—25 being locked into the lower end of slot 17 as described above. At the end of the toasting operation, the lever 31 through the cam or trigger 43 moves the pin 24—25 into the vertical part of slot 17 and the ejector spring 21 lifts the elevator 20 and ejects the toast. At the end of the toasting operation, the spring 35, having been put under tension by the roller 37 traversing the curved slot 38 moves the pawl 33 past the upper end of the gate 40 to a position underneath the roller 39.

I claim:

1. In an automatic electric toaster a timing and switch mechanism, means for manually setting said timing and switch mechanism including a setting member adapted to occupy a position in and to follow the path of the manual means during the setting operation but to occupy a position out of the path of the manual means and to follow a different path during the toasting operation, means for retaining the setting member in the path of the manual means during the setting operation and removing the setting member out of the path of the manual means and causing the same to follow a different path during the toasting operation, and means supporting the toast whereby the manual means may be operated to bring the toast to an inspection position during the toasting operation.

2. In an automatic electric toaster a timing and switch mechanism, means for manually setting said timing and switch mechanism including a setting member adapted to occupy positions both in and out of the path of the manual means, means for retaining the setting member in the path of the manual means during the setting operation and removing the setting member out of the path of the manual means during the toasting operation, means supporting the toast whereby the manual means may be operated to bring the toast to an inspection position during the toasting operation, spring-actuated toast ejecting means for ejecting the toast at the end of the toasting operation, means for locking the toast ejecting means in the toasting position, said toast ejecting means being operated by the manual means during the setting operation, against the tension of the spring to lock the same, and means for tripping the locking mechanism at the end of the toasting operation.

3. In an automatic electric toaster a timing and switch mechanism, means for manually setting said timing and switch mechanism including a setting member adapted to occupy positions both in and out of the path of the manual means, means for retaining the setting member in the path of the manual means during the setting operation and removing the setting member out of the path of the manual means during the toasting operation, and means supporting the toast whereby the manual means may be operated to bring the toast to an inspection position during the toasting operation, the timing and switch mechanism comprising a pivoted lever and the setting member is pivoted thereto with the free end thereof adapted to be disposed in the path of the manual means during the setting operation.

4. In an automatic electric toaster a timing and switch mechanism, means for manually setting said timing and switch mechanism including a setting member adapted to occupy positions both in and out of the path of the manual means, means for retaining the setting member in the path of the manual means during the setting operation and removing the setting member out of the path of the manual means during the toasting operation, and means supporting the toast whereby the manual means may be operated to bring the toast to an inspection position during the toasting operation, the timing and switch mechanism comprising a pivoted lever and the setting member is pivoted thereto with the free end thereof adapted to be disposed in the path of the manual means during the setting operation, and a gate, one side of which is engaged by the setting member during the setting operation and the other side of which is engaged by the setting member during the toasting operation.

5. In an automatic electric toaster a timing and switch mechanism, means for manually setting said timing and switch mechanism including a setting member adapted to occupy positions both in and out of the path of the manual means, means for retaining the setting member in the path of the manual means during the setting operation and removing the setting member out of the path of the manual means during the toasting operation, and means supporting the toast whereby the manual means may be operated to bring the toast to an inspection position during the toasting operation, the timing and switch mechanism comprising a pivoted lever and the setting member is pivoted thereto with the free end thereof adapted to be disposed in the path of the manual means during the setting operation, and a gate one side of which is engaged by the setting member during the setting operation and the other side of which is engaged by the setting member during the toasting operation, together with a spring causing said setting member to engage the opposite sides of the gate during the setting and toasting operations.

6. In an automatic electric toaster a timing and switch mechanism, means for manually setting said timing and switch mechanism including a setting member adapted to occupy positions both in and out of the path of the manual means, means for retaining the setting member in the path of the manual means during the setting operation and removing the setting member out of the path of the manual means during the toasting operation, and means supporting the toast whereby the manual means may be operated to bring the toast to an inspection position during the toasting operation, the retaining means comprising a gate, the opposite sides of which are engaged by the setting member during the setting and toasting operations respectively, and spring means causing said setting member to follow the opposite sides of the gate during said operation.

7. In an automatic electric toaster a timing and switch mechanism, means for manually setting said timing and switch mechanism including a setting member adapted to occupy positions both in and out of the path of the manual means, means for retaining the setting member in the path of the manual means during the setting operation and removing the setting member out of the path of the manual means during the toasting operation, and means supporting the toast whereby the manual means may be operated to bring the toast to an inspection position during the toasting operation, the retaining means comprising a gate, the opposite sides of which are engaged by the setting member during the setting and toasting operations respectively, and spring means causing said setting member to follow the opposite sides of the gate during said operation, together with a curved slot guide with a follower roll therein, a leaf spring fastened at one end to said follower roll and at its other end to the setting member.

8. In an electric toaster, a toaster frame having a toasting chamber, a rack for supporting toast and the like in said chamber, an elevator for lifting said rack and ejecting the toast together with spring means for actuating the elevator, a timing and switch mechanism which may be set to supply electrical current to the toaster for a predetermined time, a pawl for setting said timing and switch mechanism, manually operated means attached to said rack, said pawl in the off position being disposed in the path of said manually operated means for setting the timing and switch mechanism, spring means attached to said pawl tending to move the pawl out of the path of the manual device during the setting operation, means retaining the pawl in the path of the manual device against the tension of said spring means during the setting operation, but after the setting operation permitting the pawl to be swung out of the path of the manual means, said retaining means preventing the return of the pawl to a position in the path of the manual device during the toasting operation whereby said rack may be lifted from and lowered to the elevator without engaging the pawl, means for locking the elevator against the tension of the elevating spring to support the rack at the bottom of the toasting chamber during the toasting operation and for tripping the lock at the end of the toasting operation to permit toast ejection.

9. In an electric toaster of the character set forth in claim 8 wherein the frame comprises a guide post for the manual means and the rack and also the elevator.

10. In an electric toaster of the character set forth in claim 8 wherein the frame comprises a guide post for the manual means and the rack and also the elevator, together with a plate having a guide slot parallel to the post for accommodating and guiding a locking pin carried by the elevator, said slot having a locking shoulder at the bottom for engaging the pin and holding the elevator in the toasting position against the tension of the spring.

11. In an electric toaster of the character set forth in claim 8 wherein the frame comprises a guide post for the manual means and the rack and also the elevator, together with a plate having a guide slot parallel to the post for accommodating and guiding a locking pin carried by the elevator, said slot having a locking shoulder at the bottom for engaging the pin and holding the elevator in the toasting position against the tension of the spring, said elevator having a loose fit with the guide post and said elevating spring being attached to the elevator in a manner to tilt the same and retain the pin under the shoulder during the toasting operation.

12. In an electric toaster of the character set forth in claim 8 wherein the frame comprises a plate with a curved slot therein, together with a follower device disposed in said curved slot, said spring means being attached at one end to the pawl and at the other end to the follower device, said slot and said spring being arranged to urge the setting pawl out of the path of the manual means during the setting operation and to urge the same towards a position in the path of the manual means on the return movement.

13. In an electric toaster of the character set forth in claim 8 wherein the frame comprises a plate with a curved slot therein, together with a follower device disposed in said curved slot, said spring means being attached at one end to the pawl and at the other end to the follower device, said slot and said spring being arranged to urge the setting pawl out of the path of the manual means during the setting operation and to urge the same towards a position in the path of the manual means on the return movement, and the retaining means comprises a gate parallel to the movement of the manual means and a pin carried by the pawl which rides on one side of the gate during the setting operation and on the other side of the gate during the return movement.

14. In an electric toaster of the character set forth in claim 8 wherein a bumper device is disposed in the path of the manual device and rack to be engaged thereby when the elevator is actuated to the toast ejected position.

15. In an automatic electric toaster, a casing having a compartment for the reception of a slice of toast and an opening through which the toast may be lifted, a liftable toast carrier guided in said compartment together with a manually operated device for lowering and lifting the carrier, a timing and switch mechanism unit, a setting member for said unit having a part thereof disposed in the path of the manual device and engaged thereby during the setting operation, said part being adapted to follow a different path on the return movement, and means for compelling said operating member to follow said different path during the return and toasting operation and compelling said member to reoccupy its position in the path of the manual device at the end of the return and toasting operation.

16. In an electric toaster comprising a timing and switch mechanism, a frame having a compartment for the reception of a slice of toast and an opening through which the toast may be lifted, a liftable toast carrier guided in said compartment together with a manual device for manually lowering and lifting the carrier and setting said mechanism, a setting member for said mechanism disposed in the path of and engaged by a part of the carrier and the manual device during the lowering of the carrier to set the timing and switch mechanism for a definite toasting period, and means preventing engagement between said setting member and said part after the setting operation is completed and during the toasting period thus set, and thereby permitting the lifting and lowering of said carrier and manual device for toast inspection during the toasting operation without resetting or interfering with said mechanism.

17. In an electric toaster comprising a timing and switch mechanism, a frame having a compartment for the reception of a slice of toast and an opening through which the toast may be lifted, a liftable toast carrier guided in said compartment together with a manual device for manually lowering and lifting the carrier and setting said mechanism, a setting member for said mechanism disposed in the path of and engaged by a part of the carrier and the manual device during the lowering of the carrier to set the timing and switch mechanism for a definite toasting period, means preventing engagement between said setting member and said part after the setting operation is completed and during the toasting period thus set, an elevator guided in said frame and biased to lift the carrier and manual device to the toast ejected position, a lock for locking the elevator in the toasting position against the biasing means when said carrier and manual device are actuated to set the timing mechanism and lower the elevator, and means whereby said timing and switch mechanism trips said lock at the end of the toasting period, thereby permitting toast inspection by manipulating the manual device without resetting or interfering with the timing mechanism and without tripping the lock.

18. In an automatic electric toaster a frame having a toasting chamber therein, a rack supporting the toast in said chamber and a spring actuated ejector engaging said rack, guide means upon which the ejector is loosely mounted, a plate having a slot therein parallel to the guide means and having at the bottom thereof a locking portion, said ejector having a pin following said slot and adapted to be locked in the lower portion of said slot, an actuating ejector spring engaging said ejector and adapted to slightly tilt the same to cause the pin to remain in the locking portion of the guide slot, and a timing mechanism for tripping the ejector.

19. In an automatic electric toaster, a timing and switch mechanism, a setting member pivotally connected with an operating member for said mechanism, the free end of said setting member being adapted to follow one path during the setting operation and to follow a different path during the toasting operation, a manually operated device having a part following the first named path and adapted to operatively engage the free end of said setting member, means for supporting toast within the toaster and operative connections between the manually operated device and the supporting means whereby the manual device may be operated to bring the toast to an inspection position.

20. In an automatic electric toaster, a casing having a compartment for the reception of a slice of toast and an opening through which the toast may be lifted, a liftable toast carrier guided in said compartment together with a manually operated device for lowering and lifting the carrier, a timing and switch mechanism unit, a setting member for said unit having a part thereof disposed in the path of the manual device and engaged thereby during the setting operation, said part being adapted to follow a different path on the return movement, and means for compelling said operating member to follow said different path during the return and toasting operation and compelling said member to reoccupy its position in the path of the manual device at the end of the return and toasting operation and a spring actuated elevator for said carrier adapted to be locked in the lowermost position and means operated by the timing unit for releasing the elevator at the end of the toasting operation.

ALLAN M. YOUNG.